(12) United States Patent
Adell et al.

(10) Patent No.: US 8,690,011 B2
(45) Date of Patent: Apr. 8, 2014

(54) DEVICE FOR EMPTYING A BLOOD PRODUCT BAG

(75) Inventors: Sergi Roura Adell, Arenys De Munt (ES); Miquel Faba Vilella, Barcelona (ES); Jordi Boira Bonhora, Terrassa (ES)

(73) Assignee: Grifols, S.A., Barcelona (ES)

( * ) Notice: Subject to any disclaimer, the term of this patent is extended or adjusted under 35 U.S.C. 154(b) by 69 days.

(21) Appl. No.: 13/551,738

(22) Filed: Jul. 18, 2012

(65) Prior Publication Data

US 2013/0019993 A1  Jan. 24, 2013

(30) Foreign Application Priority Data

Jul. 22, 2011 (ES) .................................. 201131265
Nov. 24, 2011 (ES) .................................. 201131901

(51) Int. Cl.
*B67D 1/00* (2006.01)

(52) U.S. Cl.
USPC ........................................... 222/80; 414/412

(58) Field of Classification Search
USPC ........ 222/80–83, 98, 101, 102; 414/412, 403, 414/404, 408, 418
See application file for complete search history.

(56) References Cited

U.S. PATENT DOCUMENTS

| | | | |
|---|---|---|---|
| 4,253,458 A | | 3/1981 | Bacehowski et al. |
| 4,340,152 A | * | 7/1982 | Ekholm, Jr. ........................ 222/1 |
| 4,725,184 A | * | 2/1988 | Bennison ...................... 414/412 |
| 5,033,929 A | * | 7/1991 | Marti ............................. 414/403 |
| 5,829,634 A | | 11/1998 | Gloger et al. |
| 5,870,886 A | * | 2/1999 | Norton ............................. 53/492 |
| 7,306,420 B2 | * | 12/2007 | Roura Adell et al. ......... 414/412 |
| 7,827,770 B2 | * | 11/2010 | Rocholl et al. .................. 53/469 |
| 2003/0185658 A1 | | 10/2003 | Roura Adell et al. |
| 2005/0019141 A1 | * | 1/2005 | De Baat ....................... 414/412 |

FOREIGN PATENT DOCUMENTS

| | | |
|---|---|---|
| DE | 10 2009 056 225 A1 | 6/2011 |
| EP | 0 159 792 A2 | 10/1985 |
| ES | 8102801 A1 | 5/1981 |
| ES | 8603338 A1 | 4/1986 |
| ES | 2 245 837 A1 | 1/2006 |
| WO | WO 93/24371 A1 | 12/1993 |

OTHER PUBLICATIONS

Spanish Search Report for ES 201131265 dated Nov. 25, 2011.
Spanish Search Report for ES 201131901 dated Mar. 15, 2012.

* cited by examiner

*Primary Examiner* — Lien Ngo
(74) *Attorney, Agent, or Firm* — RatnerPrestia (57) ABSTRACT

Device for emptying a bag containing a frozen blood-derived product, including: a cutting device; an extractor for the product, a hopper for receiving the product, a device for transporting the bag from a receiving area to the plasma extractor, this transporting device including a robotic arm with a gripper which, in turn, includes: two catching arms, each defining at least a distal end and a proximal end, and an actuator, in which the actuator controls a mechanism for modifying the distance separating the distal ends of the gripper arms to catch the bag by its lower surface.

19 Claims, 12 Drawing Sheets

DEVICE FOR EMPTYING A BLOOD PRODUCT BAG

The present invention relates to a device for removing a frozen product (preferably blood or a blood-derived product) from a flexible plastic container.

The use of a flexible plastic container for the storage of blood and its components is well known in the medical field. Separating the blood into various components, including plasma, red blood cells and platelets is also known.

These components are conventionally stored in plastic bags which are subsequently frozen to preserve the properties of the components.

According to the inventors' knowledge, all the methods mentioned above, aimed at fully automating the process of emptying or unloading bags, have not been successful in practice because of problems of malfunction due to the variability of size of the bags, the final shape of the frozen bag and cleaning and reliability requirements. Therefore, in industrial practice, the emptying processes are completely manual or semi-manual and involve handling of biohazardous products.

As it is a liquid product which solidifies when frozen, the exact shape of the bag once the product stored in it solidifies is unpredictable. Therefore, transporting and emptying these plastic containers is complex in that, in addition to their shape not being known, they usually become slippery because of the moisture which is frozen on the surface of the bag.

Moreover, the products stored in a particular embodiment of the present invention are usually of a biological nature and their sterility and the safety of the personnel who handle them must be maintained.

Document U.S. Pat. No. 5,829,634 discloses a device and method for unloading a frozen blood (plasma) product. This document discloses a device which includes a conveyor belt which carries the frozen plasma towards a cutting section. After making a transverse cut to the bag, the bag is moved to a toothed roller which grips the bag by the end opposite to the cut end and by applying pressure longitudinally from the gripping end to the opposite end the frozen product is expelled. Once the frozen product has been placed on the belt, means are used to collect the plasma and the bags are placed in a container for empty bags.

Document WO 93/24371 discloses a method for unloading a container of frozen blood without having to partially thaw said blood. This method stems from the need to break the bond between the frozen plasma and the bag, presumably due to moisture which can form inside the bag when sterilisation by autoclave is carried out.

This method consists in making a helical cut along the entire bag. Subsequently, the bag is passed between two rollers to eject the frozen plasma from this bag. This document also makes known that anything which exerts pressure the bag, first on one end and subsequently along the entire bag, can be used to extract the frozen contents.

Document ES8603338 discloses a device for opening bags which have a protruding flap and a weak longitudinal line, i.e. a longitudinal line across the bag is weak or the bag is made so that it can be broken along this line. The emptying device for these bags includes a bag transporting station, which advances the bag to the stations for removal of the cover where jaws grip the protruding flap. These jaws exert a force on the bag causing it to break along the weak line, thereby expelling its contents.

Therefore, none of the applications of the technique provides an adequate mechanism for plasma treatment once its content has been expelled. It is important to emphasise that the frozen products increase in temperature as they are moving on a conventional conveyor belt, and also the pressure which both the cutting tools and the jaws exert, helps to thaw the product, so that in the devices of the technique, once the frozen product bag has been cut, residues of biological material are left on the conveyor belt. This situation worsens when using devices known in the art if, after removing the frozen product, it is again placed on the conveyor belt, leaving the biological residues thawing without any protection on the belt, thus increasing the dirt on the extraction device and requiring greater and more extensive maintenance.

It is also very desirable in such applications, to maintain the cleanliness of each of the elements, which include the emptying device since, as explained above, the contents of these bags are potentially dangerous biological material which should also be handled under the best possible aseptic conditions.

Accordingly, the present invention provides a device that allows, by independent means, containers of frozen products to be emptied correctly and reliably whilst maintaining the cleanliness and sterility of the product and ensuring lower product losses than in devices known in the art and increased productivity.

It is therefore an objective of the present invention to provide a device for emptying a bag containing a blood-derived product, including:
  a cutting device;
  a product extractor;
  a hopper for receiving the product;
  a device for transporting the bag from a receiving area to the plasma extractor, this transport device including a robotic arm with a gripper which, in turn, includes:
  two catching arms, each defining at least one distal end and one proximal end, and
  an actuator,
  in which the actuator controls a mechanism for modifying the distance separating the distal ends of the said gripper arms to catch the bag by its bottom surface.

In a particular embodiment, the catching arms are two substantially semi-ellipsoidal transversal section arms attached to a transporting device by means of an articulation, with the actuator being provided with means for rotating the said articulation.

Preferably, the transport device is a robotic arm.

More preferably, the robotic arm includes a stop which is placed in one of the longitudinal ends of the bag and between said clamping arms. This stop, preferably, includes a proximity detector. In addition, the proximity detector may make a terminal to the track.

Particularly advantageously, the cutting device includes a cutting edge placed in the path of the bag between the reception point and the extractor.

More advantageously, the edge is situated above a receiving hopper of the product extracted by the extractor.

More preferably, the cutting device is a device for transversely cutting the bag. In an alternative model, the cutting device is a toothed cutting device which generates a discontinuous cut in the bag preventing the contents from coming out of the bag by their own means and allowing the extracting device to break these discontinuities of the bag by pressure.

In one model, the device includes a fixed inclined platform with lateral walls which constitute a track for centring and delivering the bag to the robotic arm. In a preferred model, the device includes a conveyor belt to transport the bags to the conveyor device (for example, to the platform).

Even more preferably, the band is inclined. This will facilitate the cleaning of the device so that the plasma, which is thawed during the track of the bag, falls due to gravity. Therefore, it is sufficient to have water available in the upper part of the band to clean the thawed plasma during its track.

Even more preferably, the plasma extractor includes two rollers. In a particular model, the rollers are in contact and rotate in opposite directions, thus enhancing the grip on the bag by making it pass through them and exerting a longitudinal pressure along the entire bag.

Preferably, at least one roller is of non-slip material.

For better understanding, drawings are appended by way of an explanatory but non-limiting example of an embodiment of the method and of the device for emptying a blood product bag according to the present invention.

FIG. 7 shows a second embodiment of a device according to the present invention.

In FIGS. 1 to 7 a robotic arm—1—can be seen which includes an arm body—11—and a gripping device—10—. Also shown are a removal device—2—, including a motor—21—, and an extractor which, in this particular case, is two rollers—22—arranged so that they come into contact to exert pressure on a container (in this particular case a bag) when the bag is put through them. Also shown is a hopper—23—for the disposal of the product extracted from said bag.

Figure 1:
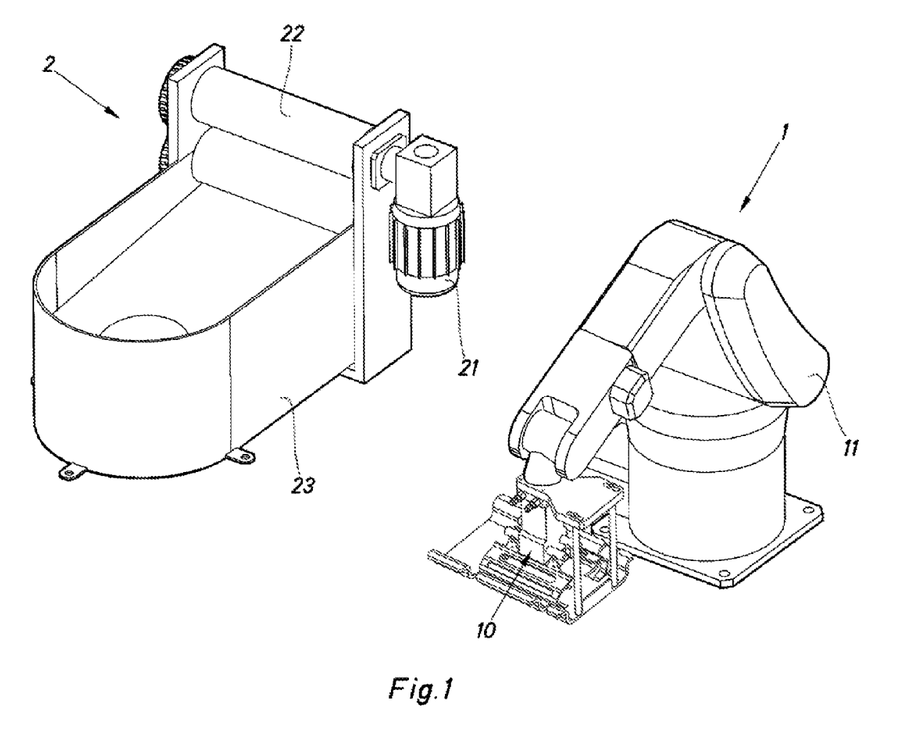
FIG. 1 shows a perspective view of an embodiment of the present invention.

The embodiment shown in FIG. 1 seeks to transfer bags located in a reception area—3—, coming from a transport system, for example, a conveyor (not shown) to an extraction device—2—which minimises the dirt produced by the thawed plasma during the transporting procedure. As a result, it is appropriate to move the container from the conveyor belt to a remote device, such as the hopper—23—.

The extraction device, in this particular case, includes two rollers—22—and a motor—21—. These rollers rotate in opposite directions so that a container (or a bag) placed at the junction of both rollers is driven towards the rollers and, in turn, a force is exerted from the content of the bag towards the outside of the rollers, i.e. towards the hopper—23—. The plastic bag—5—is absorbed in the opposite direction and delivered to a container—24—. In a particularly preferred model, one of the rollers is of metallic material and the other roller is of non-slip material.

Figure 2:
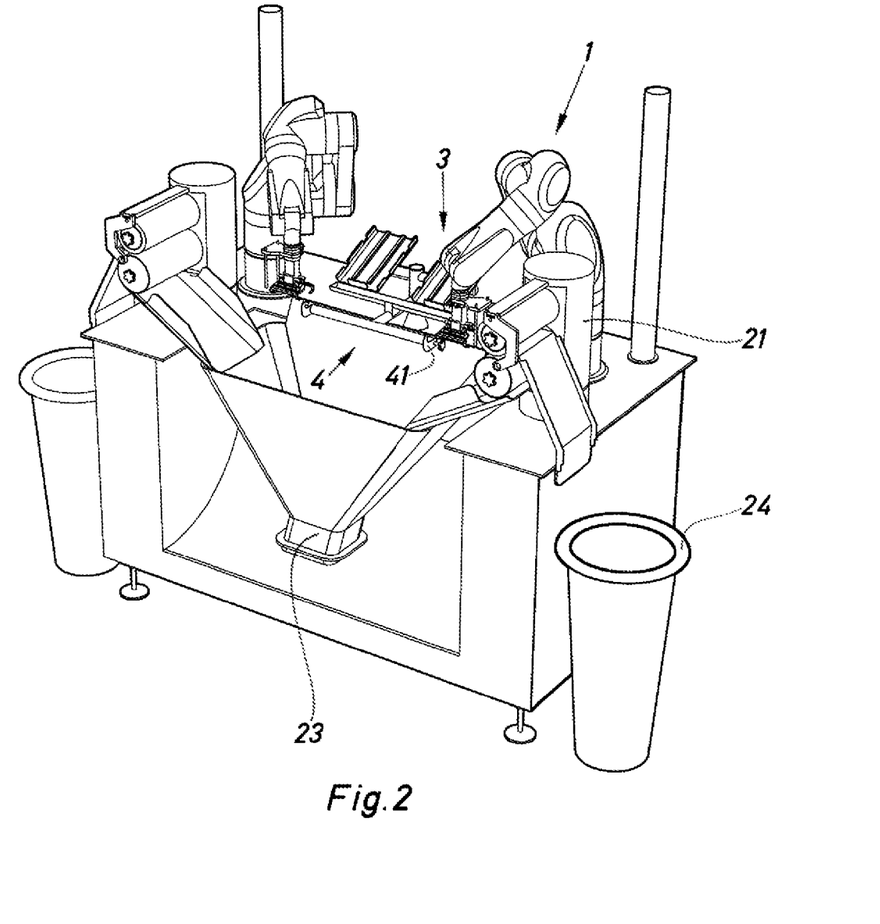
FIG. 2 is another perspective view of an embodiment of the present invention.
Figure 3:
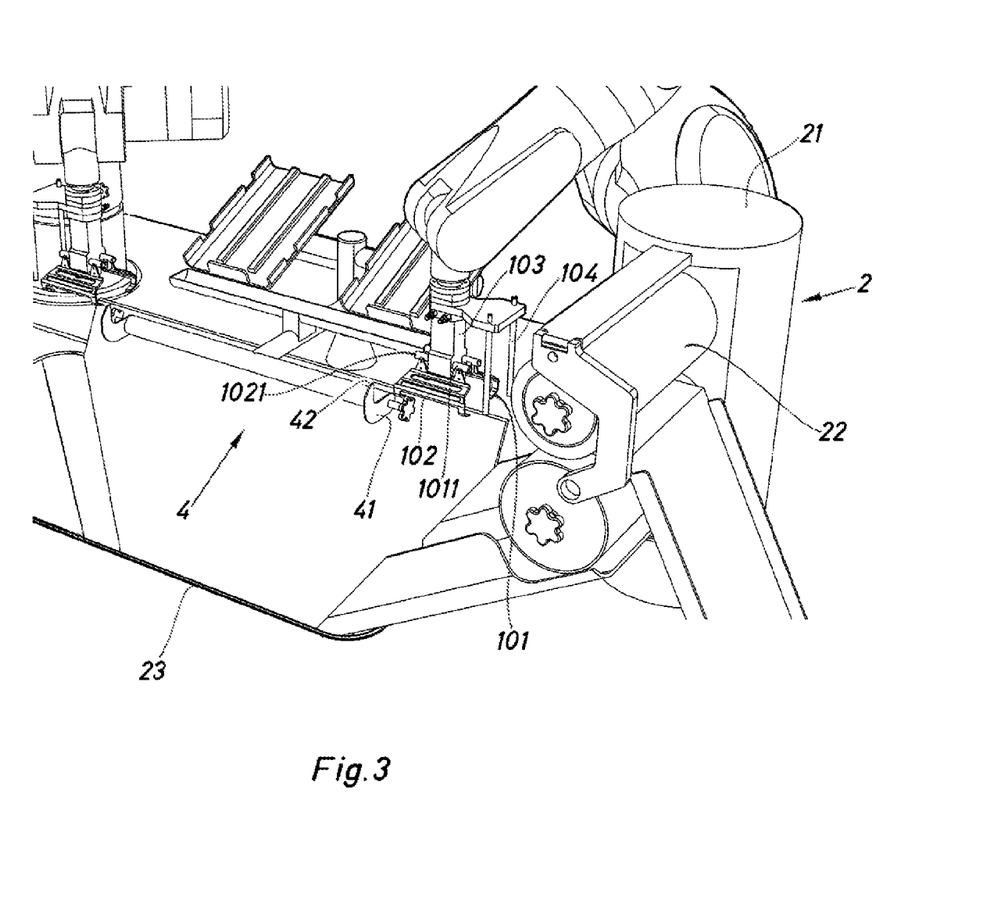
FIG. 3 is a perspective detail of the example.
Figure 4:
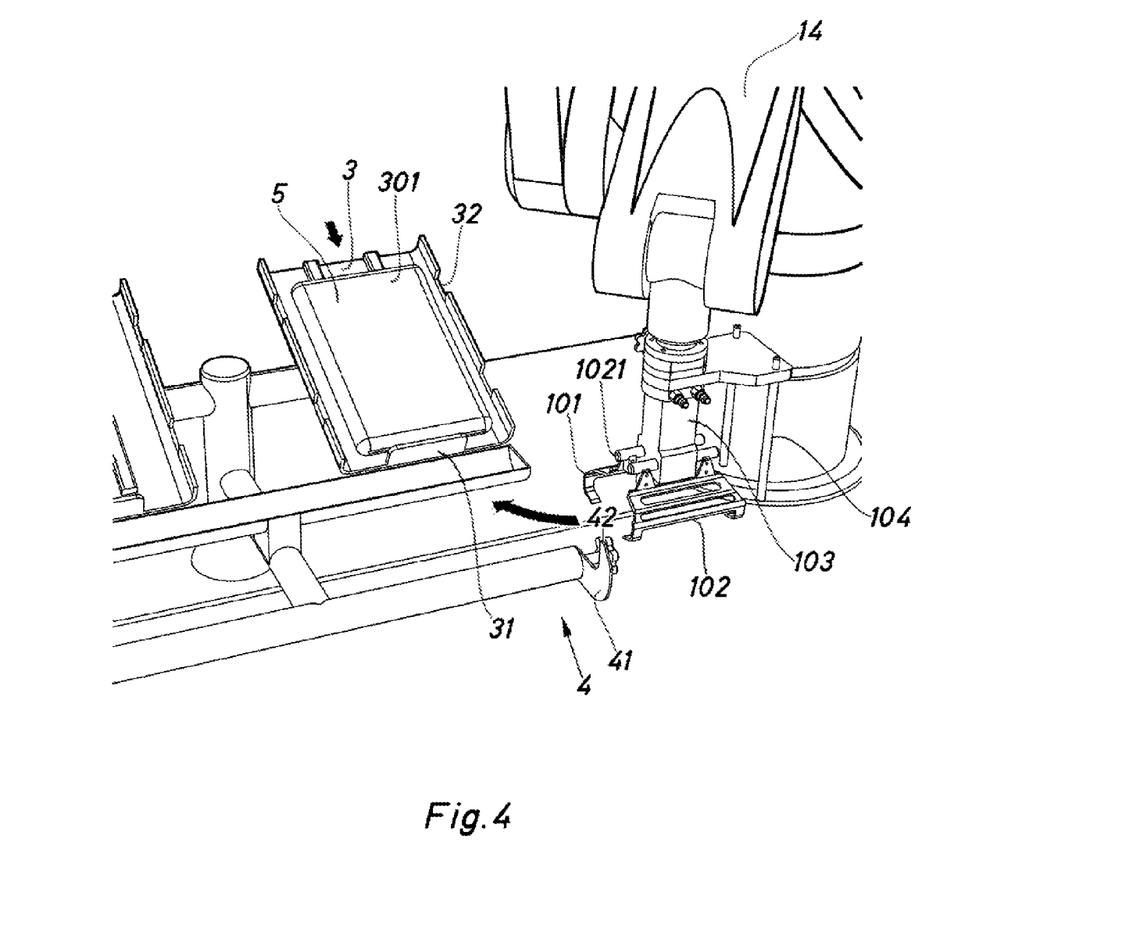
FIGS. 4 to 7 are respective perspective details illustrating a process of collecting a bag, cutting the same and extracting its contents.
Figure 5:
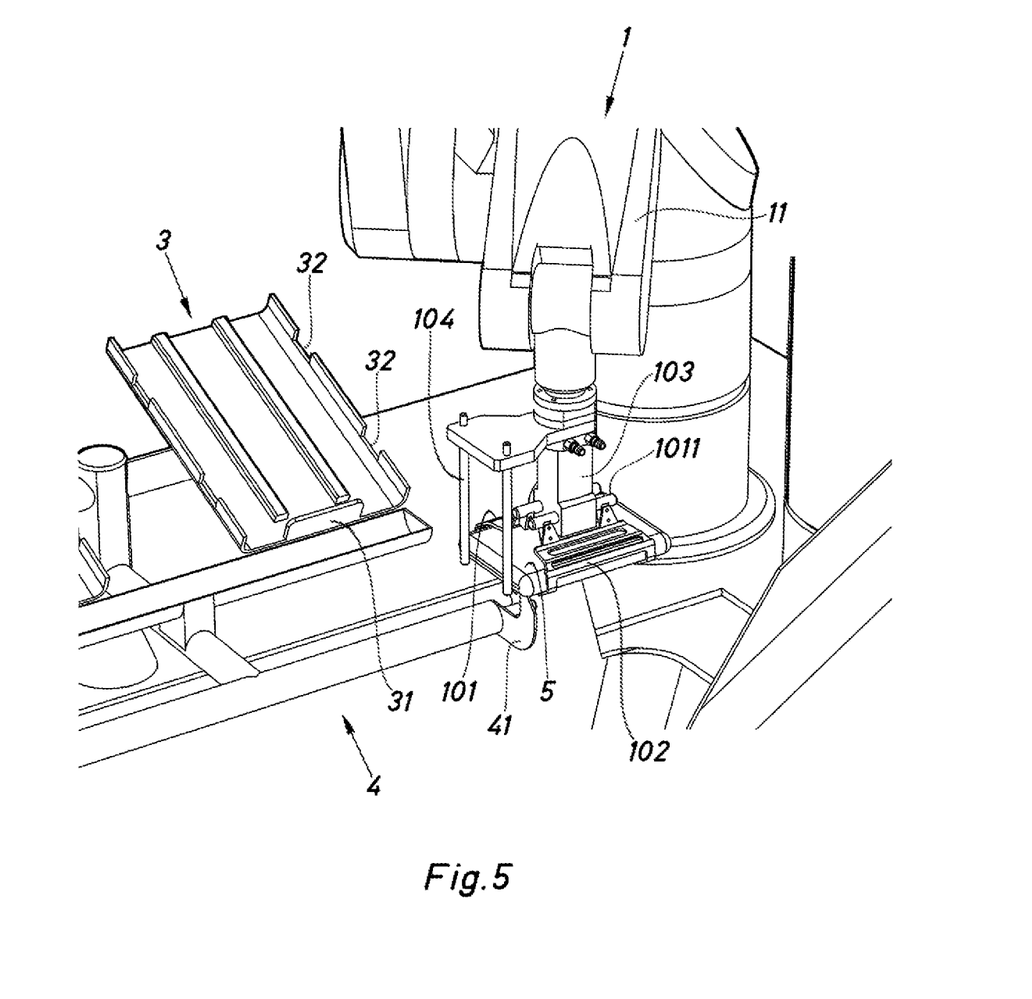
Figure 6:
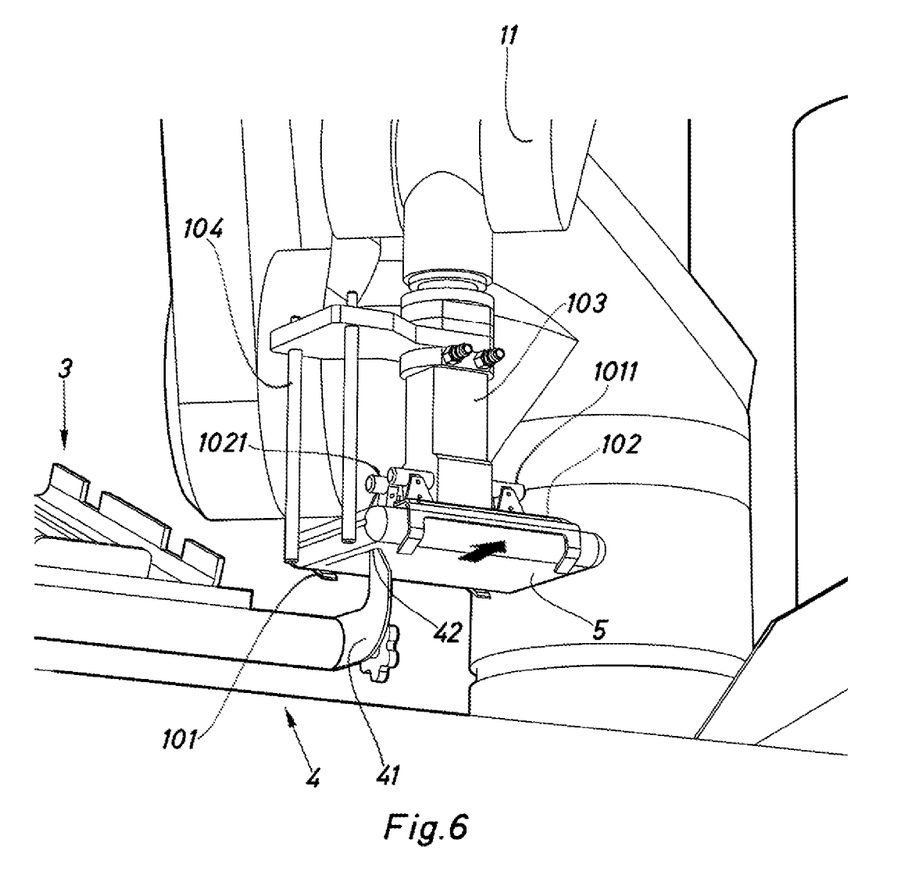

The gripping device—1—in the example includes two semi-ellipsoid arms—101—,—102—although in a particularly preferred model, they could be two "L" shaped arms. The arm—101—is attached to a projection—103—of the robotic arm (not shown) by means of a rotatable joint, i.e. an articulation—1011—. The rotation of this articulation—1011—defines whether the position of the gripping device is an active or a passive position. In the same manner, the articulation—1021—defines the position of the arm—102—.

In order to explain the invention simply, the term "active position" will be applied to the position in which the arm catches the container and the term "passive position" to the one in which the arm does not catch the container. In order to achieve the passive position, an actuator (not shown) rotates the articulations—1021—,—1011—in opposite directions causing the arms—101—,—102—to rotate in opposite directions such that the gripping device opens, allowing the arm to approach a container.

It is to be emphasised that this model of the gripping device allows the container to be caught by its base; this detail is of significant importance since the containers, in a preferred model, contain frozen material which makes the container too slippery to be held by its lateral ends. Furthermore, the use of the arms—101—,—102—of the present invention provide an additional clamping of the container by keeping it resting on its base at the semi-ellipsoidal arms.

The gripping device coupled to the body of the robotic arm—11—incorporates a stop—104—. The incorporation of the stop—104—makes it possible for the device to detect the proximity of the surface on which the containers are situated by incorporating a proximity sensor at its distal end. Surprisingly, the incorporation of the stop—104—prevents the bag from moving longitudinally on the arms thus preventing biohazardous material from falling.

Furthermore, in one particular model, this stop—104—is used also as a pushing device once the bag is placed between the rollers. The location of this stop may be variable depending on the particularities of each application. In a particularly preferred model, the said stop is placed in the gripping device and not in the arm body.

In the embodiment shown, a reception area can also be seen—3—from where the robotic arm—1—picks up the bag—5—. In the example shown, the reception area is a fixed platform or an inclined tray with a stop—31—and side walls with openings—32—which favour the passage of the fingers of the arms—101—,—102—of the claw of this arm. The tray is thus a centring track and delivers the bags to the robotic arm—1—.

In the embodiment shown, furthermore, the device includes a cutting device—4—which includes a fixed blade—41—with an upper edge—42—.

The blade—41—is located above the hopper—23—for collecting the product, in such a way that any drop which may escape from the bag—5—during the cutting process would fall into the hopper—23—together with the frozen material extracted from the bag—5—by the rollers—22—.

The cutting device—4—is in an intermediate position between the reception area—3—and the extractor—2—. Specifically, the knife—41—, which is fixed, is in the path which the bag—5—follows, just below it.

FIGS. 4 to 7 show the process of collection, cutting and extraction of a bag—5—. The robotic arm picks up the bag—5—and the upper edge—41—of the blade—42—tears the bag. For this application, it is not even necessary for the edge—42—to be very sharp, since to meet the objective it is not necessary to make an effective cut of the bag. A partial tear is sufficient to generate a preferred area of opening, when the rollers—21—exert pressure on the bag.

The embodiment of FIGS. 7 to 12 includes a conveyor on which completely sealed frozen plasma bags are arranged. This conveyor belt carries the bags to a cutting device. Subsequently, the cutting device makes a cut, either continuous (conventional blade) or discontinuous (serrated blade) in one of the ends of the bag. Then the bag is carried, by means of the mechanical robotic arm—1—, to an extraction device which extracts the frozen product from the bag, and this frozen product is collected in a hopper—23—designed for that purpose.

In order to facilitate cleaning of the device, the conveyor can be inclined at an angle. Thus, when cleaning is required, it is enough to have water (or a suitable liquid for cleaning) which will fall by gravity removing the contaminants which may be produced due to the natural thawing of the bags when the procedure takes place.

The cutting device may be a continuous or discontinuous cutting device, in one preferred model the cutting is performed discontinuously, such that, when the bag is available in the extractor this exerts a sufficient force on the bag to complete breaking it and ejecting the contents.

Figure 7:
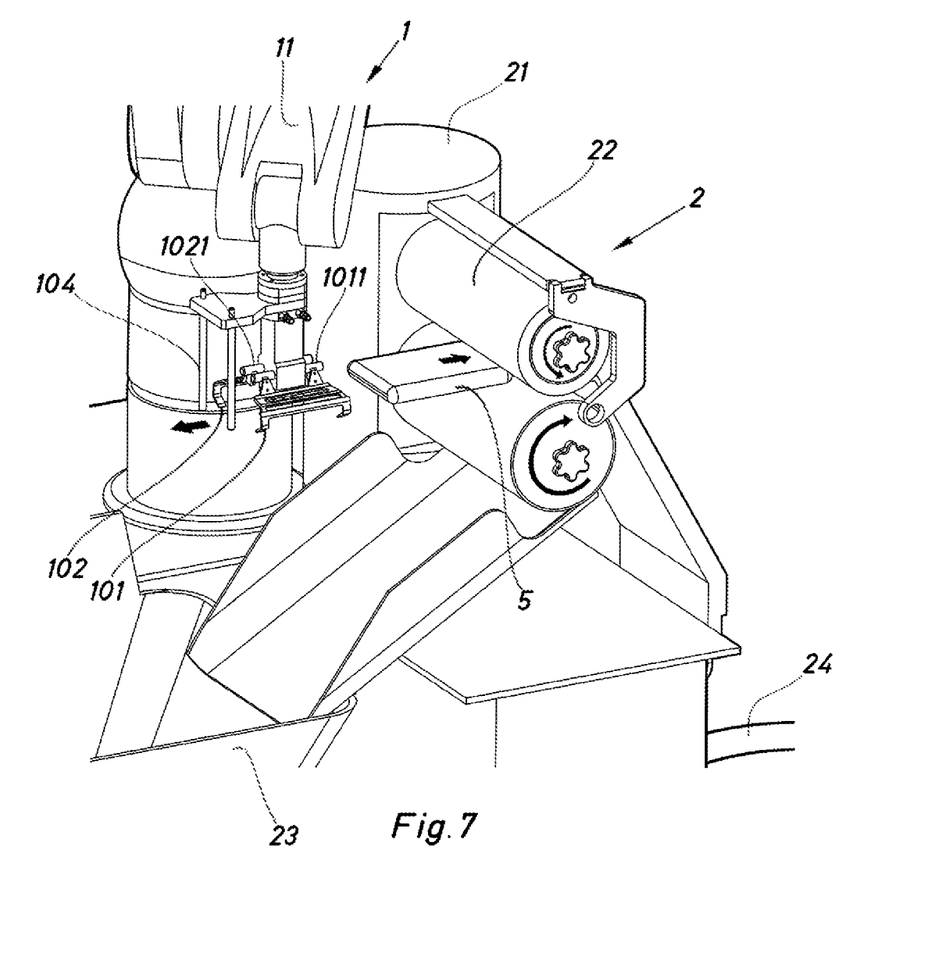

In FIG. 7 the robotic arm—1—can be seen which includes an arm body—11—and a gripping device—10—. The extracting device—2—is also shown and includes a motor—21—and an extractor which, in this particular case, is two rollers—22—arranged so that they come into contact to exert pressure on a container (in this particular case a bag) when the bag is placed across them. Additionally, a hopper—23—is shown for the disposal of the product extracted from this bag.

The embodiment shown in FIG. 7 can be intended for transferring bags originating from a transport system, for example, a conveyor (not shown) to an extraction device—2—which minimises the dirt produced by the thawed plasma during the transport process. Therefore, it is appropriate to move the container from the conveyor belt to a remote device, such as the hopper—23—.

The extraction device, in this particular case, includes two rollers—22—and a motor—21—. These rollers rotate in opposite directions such that a container (or bag) placed at the junction of the two rollers is driven into the rollers and, in turn, a force is exerted from the inside of the bag towards the outside of the rollers, i.e. towards the hopper—23—. In a particularly preferred model, one of the rollers is of metallic material and the other roller is of a non-slip material.

Figure 8:
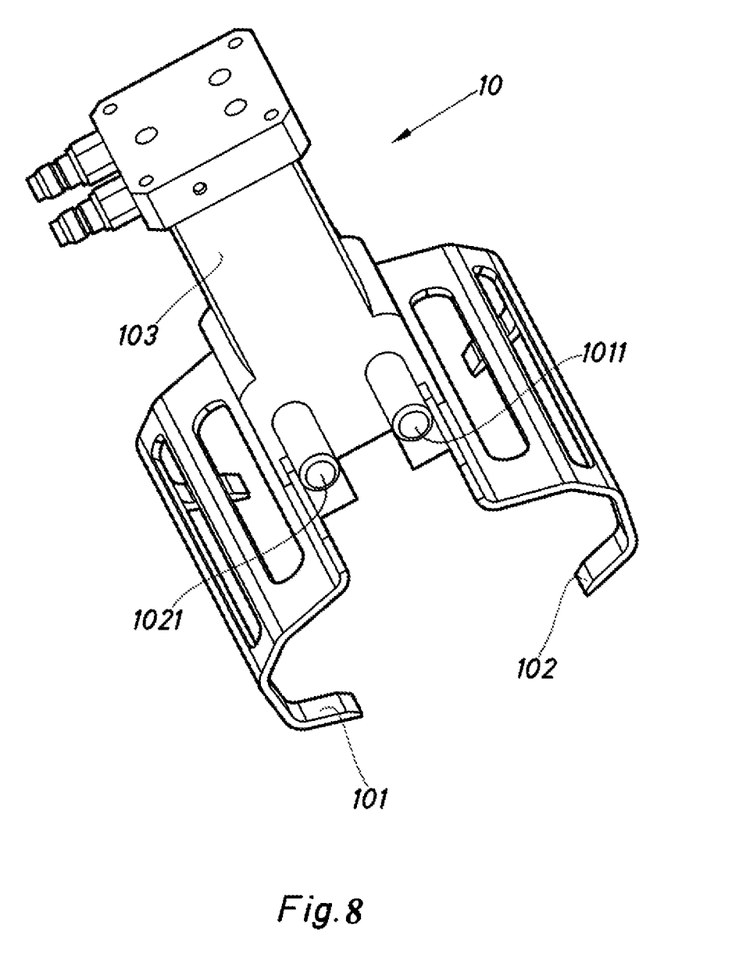
FIG. 8 shows a perspective view of a gripping device according to the present invention.

FIG. 8 shows a gripping device—10—according to the present invention. The embodiment of FIG. 2 includes two semi-ellipsoidal arms—101—,—102—, although in a particularly preferred model, they could be two "L" shaped arms. The arm—101—is attached to a projection—103—of the robotic arm (not shown) by means of a rotatable joint, i.e. an articulation—1011—. The rotation of this articulation—1011—defines whether the gripping device is in an active or a passive position. In the same manner, the articulation—1021—defines the position of the arm—102—.

In order to explain the invention simply the term "active position" will be applied to where the arm catches the container and the term "passive position" where the arm does not catch the container.

Figure 9:
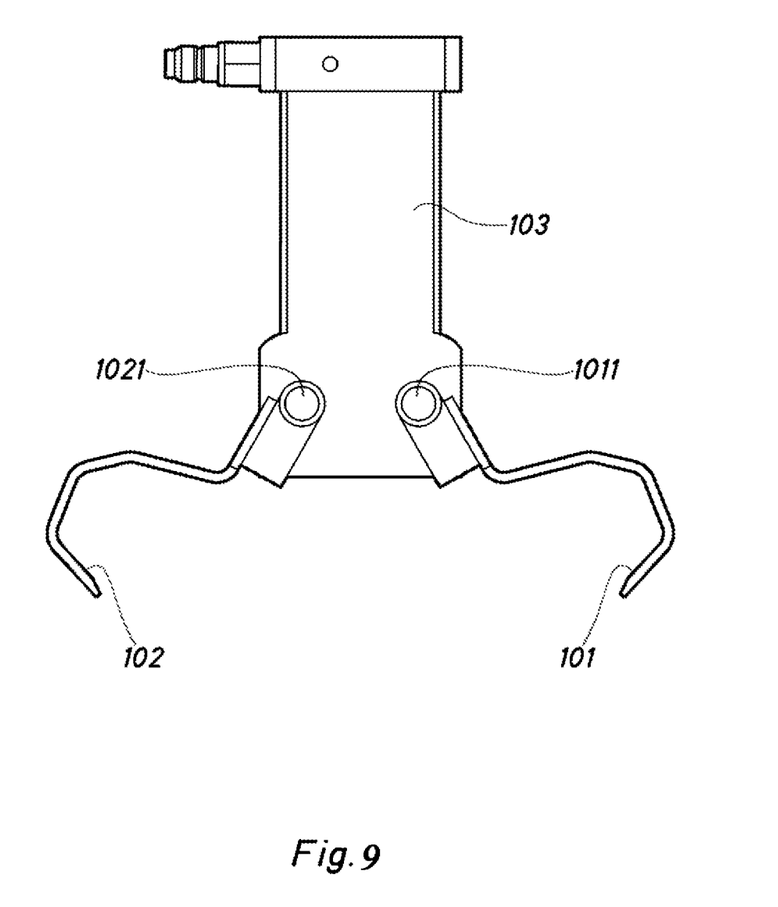
FIG. 9 shows a side view of the gripping device of FIG. 8 in a passive position.

FIG. 9 shows the embodiment of the gripping device of FIG. 2 in a passive position. In order to achieve this passive position, an actuator (not shown) rotates the articulations—1021—,—1011—in opposite directions causing the arms—101—,—102—to rotate in opposite directions such that the gripping device opens, allowing the arm to approach a container.

Figure 10:
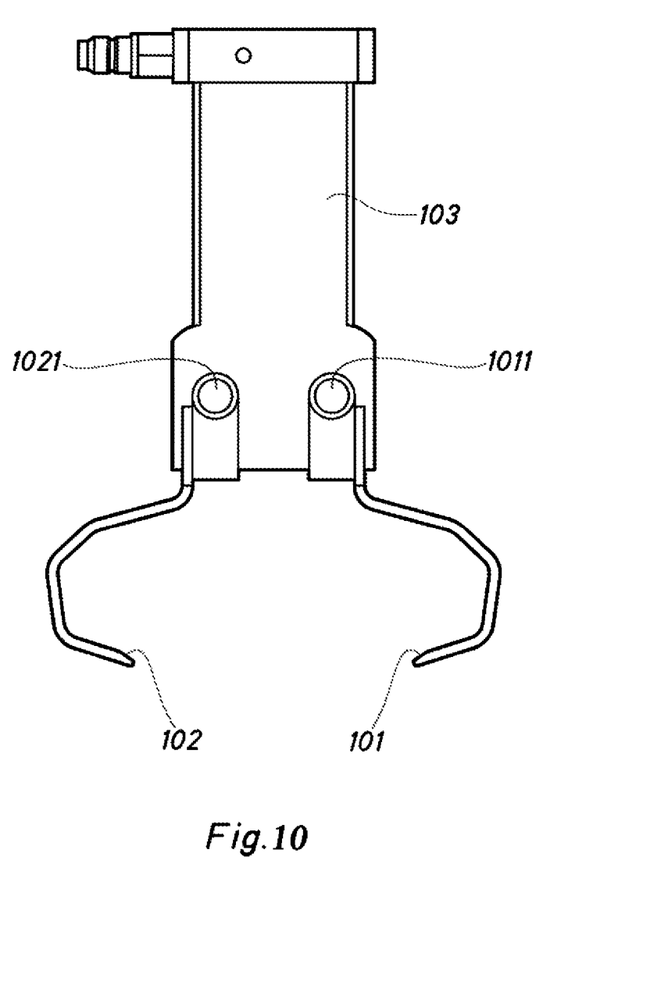
FIG. 10 shows a side view of the gripping device of FIG. 8 in an active position.

FIG. 10 shows the embodiment of the gripping device of FIG. 2 in an active position. It is to be noted that this model of the gripping device allows the container to be caught by its base; this detail is of significant importance in that the containers, in a preferred model, contain frozen material which makes the container too slippery to be held by its side ends.

Furthermore, the use of the arms—101—,—102—of the present invention provides an additional clamping of the container so as to keep it resting on its base at the semi-ellipsoidal arms.

Figure 11:
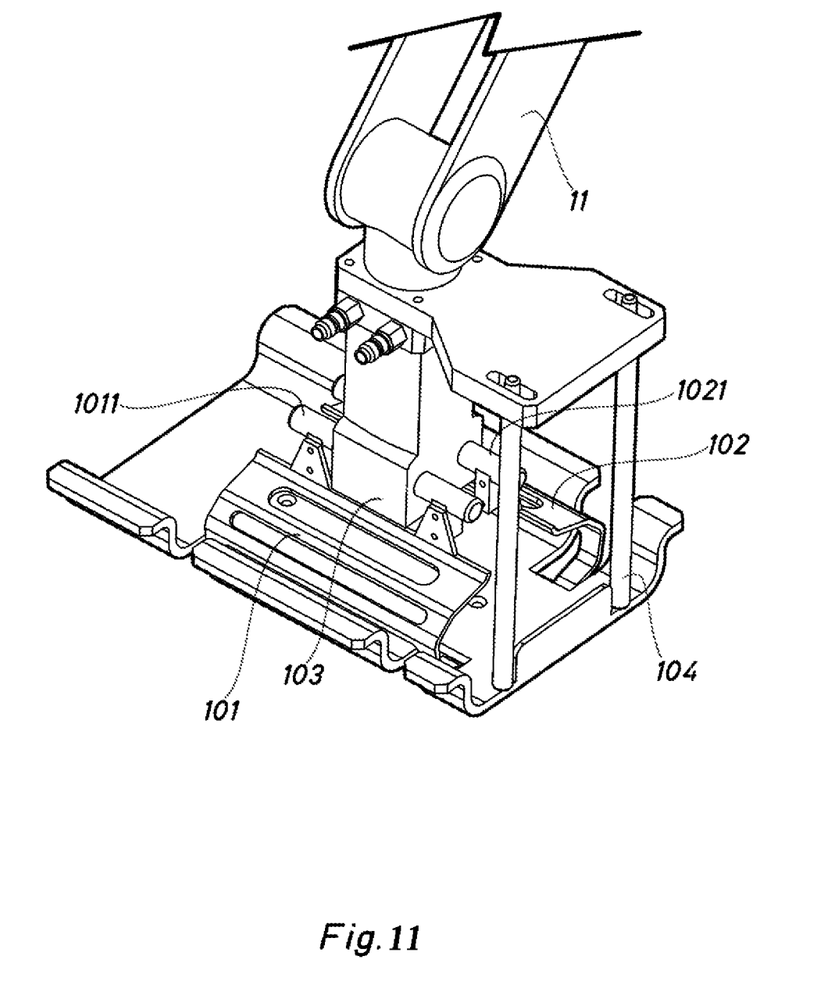
FIG. 11 shows the gripping device of FIGS. 8, 9 and 10 and their attachment to the robotic arm.
Figure 12:
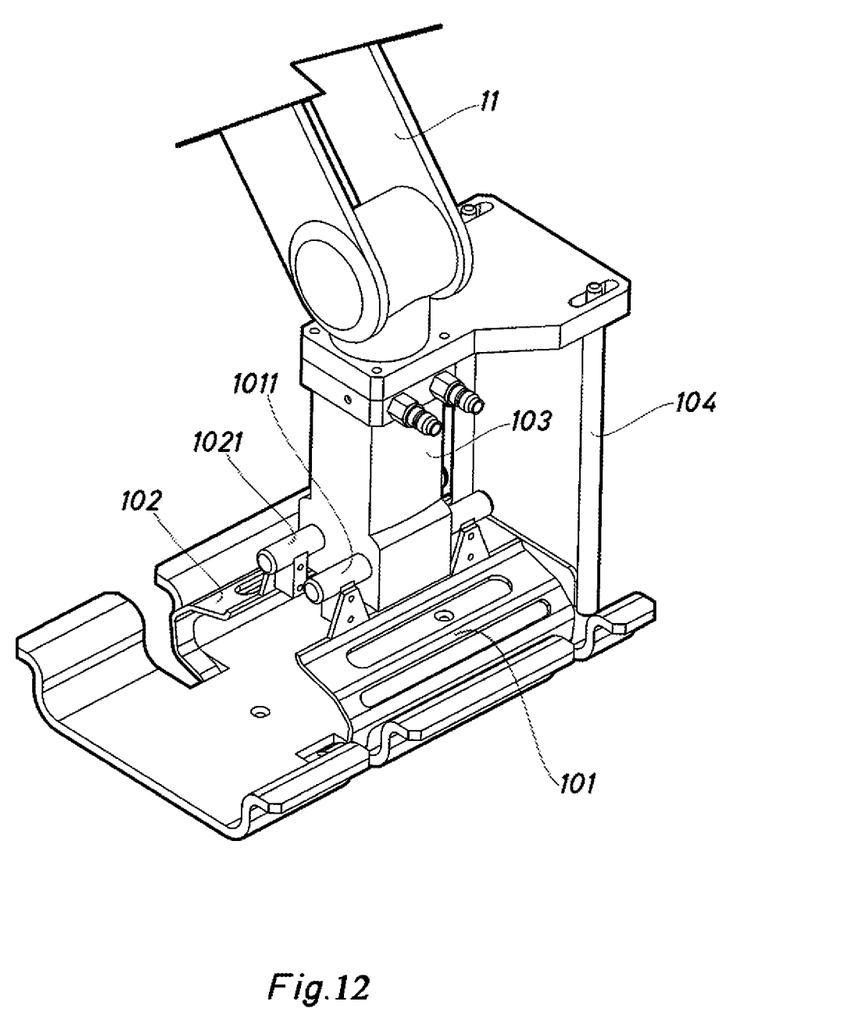
FIG. 12 shows a side view of the device of FIG. 11.

FIGS. 11 and 12 show the gripping device coupled to the body of the robotic arm—11—, at which point the incorporation of a stop—104—can be seen.

The incorporation of the stop—104—enables the device to detect the proximity of the surface on which the containers are located by incorporating a proximity sensor at its distal end.

Surprisingly, the incorporation of the stop—104—stops the bag moving longitudinally on the arms, thus preventing biohazardous material from falling.

Furthermore, in one particular model, this stop—104—is also used as a pushing device as long as the bag is between the rollers. The location of this stop may be variable depending on the particularities of each application. In a particularly preferred embodiment, this stop is placed in the gripping device and not in the body of the arm.

The invention claimed is:

1. A device for emptying a bag containing a frozen blood-derived product comprising:
   a cutting device;
   a product extractor;
   a hopper configured to receive the blood-derived product;
   a device configured to transport the bag from a receiving area to the product extractor, and including a robotic arm with a gripper that further comprises:
   two catching arms, each defining at least one distal end and one proximal end, and
   an actuator,
   in which the actuator controls a mechanism modifying the distance separating the distal ends of the gripper arms to catch the bag.

2. A device according to claim 1, wherein the cutting device includes a cutting edge placed between a reception area and the product extractor.

3. A device according to claim 2, wherein the cutting edge is situated above the hopper.

4. A device according to claim 3, wherein the transporting device is a robotic arm.

5. A device according to claim 2, wherein the reception area includes an inclined fixed platform with lateral walls and a track for centering and delivering bags to the transporting device.

6. A device according to claim 1, wherein the catching arms are two arms with a substantially semi-ellipsoidal cross section joined to the robotic arm by a joint.

7. A device according to claim 6, wherein the actuator has means for rotating the articulation.

8. A device according to claim 1, wherein the robotic arm includes a stop configured to be placed at a longitudinal end of the bag containing the frozen product and between the catching arms.

9. A device according to claim 8, wherein the stop includes a proximity sensor.

10. A device according to claim 9, wherein the proximity sensor is at a distal end of the stop.

11. A device according to claim 1, wherein the cutting device is configured to a transversely cut the bag.

12. A device according to claim 1, further comprising a bag conveyor belt for transporting the bag to the transporting device.

13. A device according to claim 12, wherein the conveyor belt is inclined.

14. A device according to claim 1, wherein the plasma extractor comprises two rollers.

15. A device according to claim 14, wherein the rollers are in contact.

16. A device according to claim 14, wherein the extractor includes a motor configured to rotate the rollers.

17. A device according to claim 14, wherein the rollers are interconnected such that they rotate in opposite directions.

18. A device according to claim 14, wherein at least one roller is made of a non-slip material.

19. A device according to claim 2, wherein the cutting device is a serrated blade.

* * * * *